(No Model.)

M. M. McDIRMIT.
Harrow.

No. 229,265.      Patented June 29, 1880.

Witnesses
Fred G. Dietrich
T. Hall Sweet

Inventor
Michael M. McDirmit
By Parker H. Sweet Jr.
Atty.

UNITED STATES PATENT OFFICE.

MICHAEL M. McDIRMIT, OF CHARLESTON, ILLINOIS.

HARROW.

SPECIFICATION forming part of Letters Patent No. 229,265, dated June 29, 1880.

Application filed March 11, 1880. (No model.)

*To all whom it may concern:*

Be it known that I, MICHAEL M. McDIRMIT, of Charleston, in the county of Coles and State of Illinois, have invented certain new and useful Improvements in Harrows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improved construction of harrows; and it consists of a triangular frame formed of two right-angled triangular sections hinged or pivoted together and capable of being operated by a peculiarly-arranged lever, all as will be hereinafter more fully described, and pointed out in the claim.

Figure 1:
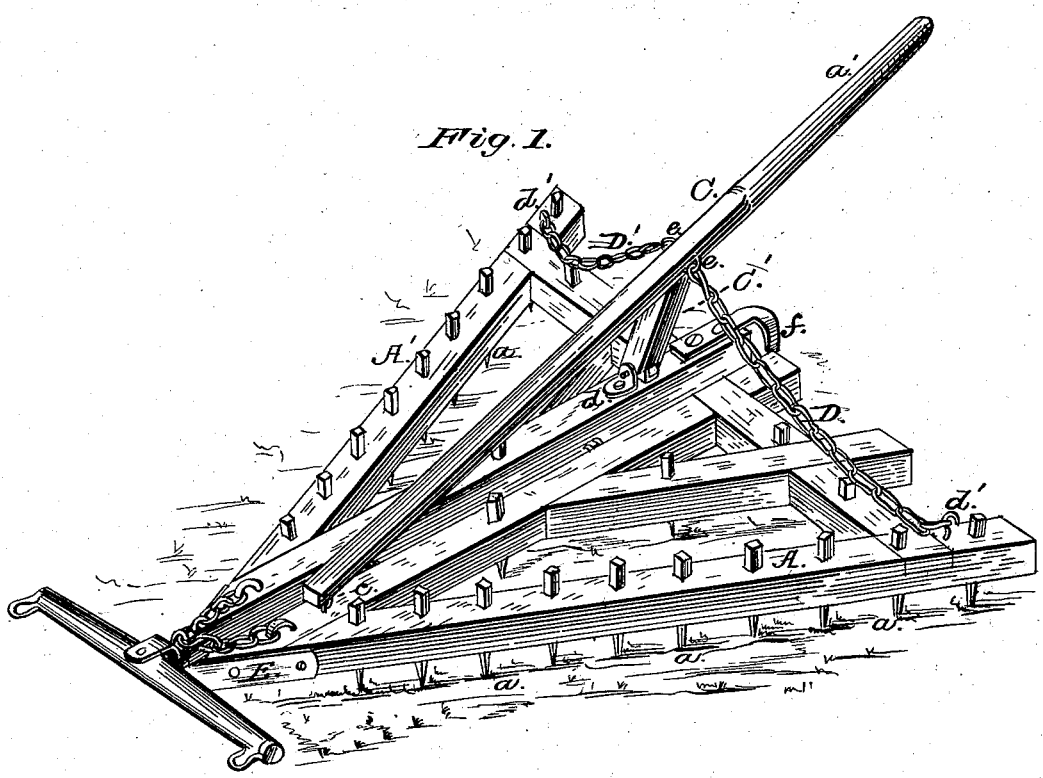
Figure 2:
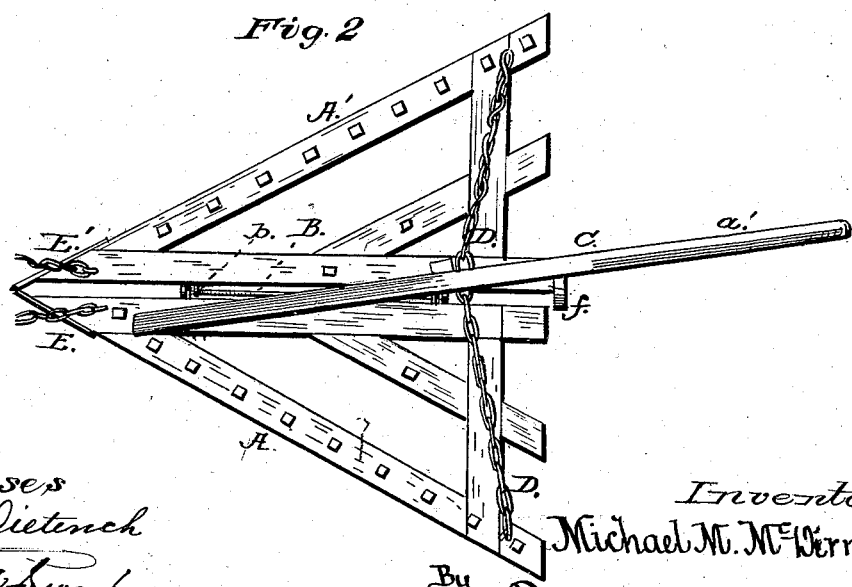

Referring to the drawings, Figure 1 represents a perspective view of my invention, and Fig. 2 a top-plan view thereof.

Similar letters of reference occurring on the several figures indicate corresponding parts.

A A' represent two right-angled triangular sections, forming the main frame of my improved harrow, said sections being provided with teeth $a$, as in the usual manner, and having eyebolts $b$ arranged upon their inner sides, through which passes a rod, B, to connect the two sections together, as shown in Fig. 2.

In place, however, of the eyebolts and connecting-rod, the two sections may be hinged or pivoted together in any suitable manner, as may be deemed preferable.

C represents a lever, provided at the rear with a downwardly-projecting beam, C', said lever being arranged diagonally across the top of the harrow, and pivoted at the front to the inner end of the section A by the eyebolts $c$, and at the rear to the inside rear end of the section A by the engagement of the lower end of the beam C' with the lug $d$, as shown in Fig. 1, the object of which is such that the lever C has its fulcrum first upon one section and then upon the other, according to the section to be lifted, the fulcrum being always upon the section opposite that of the one to be lifted, and rendering the handling and lifting of the sections very easy.

D D' represent chains, the one ends of which are securely attached to a staple, $d'$, on the outer rear ends of the sections A A', and the other ends connected by means of a hook to a staple, $e$, one on each side of the lever C, above the vertical beam C', as shown.

To the outer front ends of the sections A A' are provided steel blades E E', bolted to said sections, and curved at their front ends in such a manner that the point of one blade slightly overlaps that of the opposite one, the object of which is to prevent the space between the two sections from becoming clogged or choked with litter or clods.

To the rear end of the section A' is attached a downwardly-projecting tooth or point, $f$, by means of which the harrow may be turned, as upon a pivot, as also providing means for cutting out the center in passing over the ground.

The construction of my invention being as described, it will be observed that in the operation of the same either of the sections A A' can be readily raised from the ground by bearing down upon the lever C in an opposite direction from that of the section to be raised, so as to clear obstructions, such as stumps or stones in the field, and to clean the teeth $a$ from the litter or trash which may have accumulated upon them.

The harrow, being divided into two sections and operated by the lever C, having its fulcrum always upon the section opposite the section to be raised, requires but little strength to operate and control the same.

I am aware that harrows composed of sections hinged together and provided with levers for lifting the same are not new, nor do I desire to claim such a construction, broadly; but What I do claim as new and useful is—

In a harrow composed of the hinged sections A A', and provided with the rear tooth, $f$, and front blades, E, as described, the combination of the lever C, provided with chains D, and having its front pivoted to the section A, and the rear to the section A' by means of beam C', so as to throw the fulcrum thereof upon the section opposite the one to be lifted, substantially as and for the purpose specified.

In testimony that I claim the foregoing as my own invention I affix my signature in presence of two witnesses.

MICHAEL M. McDIRMIT.

Witnesses:
J. W. NEAL,
GEORGE STILES.